(12) United States Patent
Juliato

(10) Patent No.: US 10,638,316 B2
(45) Date of Patent: Apr. 28, 2020

(54) WEARABLE COMPUTER APPARATUS WITH SAME HAND USER AUTHENTICATION

(71) Applicant: Intel Corporation, Santa Clara, CA (US)

(72) Inventor: Marcio Juliato, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 15/164,167

(22) Filed: May 25, 2016

(65) Prior Publication Data
US 2017/0347262 A1 Nov. 30, 2017

(51) Int. Cl.
*H04W 12/06* (2009.01)
*H04M 1/02* (2006.01)
(Continued)

(52) U.S. Cl.
CPC ......... *H04W 12/06* (2013.01); *H04M 1/0202* (2013.01); *H04M 1/72522* (2013.01); *H04L 63/083* (2013.01); *H04W 12/00508* (2019.01)

(58) Field of Classification Search
CPC ........... H04W 12/06; H04W 12/00508; H04M 1/72522; H04M 1/0202; H04L 63/083
See application file for complete search history.

(56) References Cited

U.S. PATENT DOCUMENTS 8,624,836 B1 * 1/2014 Miller .................... G06F 1/163
345/157
9,213,819 B2 * 12/2015 Grigg ...................... G06F 21/32
(Continued)

FOREIGN PATENT DOCUMENTS

| KR | 10-1497829 B1 | 3/2015 |
| WO | WO2013-142516 A1 | 9/2013 |
| WO | WO2015-060856 A1 | 4/2015 |

OTHER PUBLICATIONS

Maiti, Anindya et al., "(Smart)Watch Your Taps: Side-Channel Keystroke Inference Attacks using Smartwatches", ISWC '15, Sep. 7-11, 2015, Osaka, Japan, pp. 27-30. (Year: 2015).*
(Continued)

*Primary Examiner* — Michael Pyzocha
(74) *Attorney, Agent, or Firm* — Schwabe, Williamson & Wyatt, P.C.

(57) ABSTRACT

Apparatuses, methods and storage medium associated with same hand user authentication are disclosed herein. In embodiments, an apparatus, wearable on a user's wrist, may include a user authentication module to authenticate and grant access to the user. To authenticate the user, the user authentication module may be configured to receive sensor data indicative of movements of one or more fingers over a virtual grid, analyze the sensor data to determine the movements, and authenticate and grant the user access or deny the user access to the apparatus based at least in part on a result of the analysis. The one or more fingers are fingers of a hand of the user that adjoins the wrist on which the apparatus is worn. In embodiments, the senor data may include sensor data collected by sensors configured to measure tendon/muscle positions of the wrist. Other embodiments may be disclosed or claimed.

25 Claims, 7 Drawing Sheets

(51) Int. Cl.
   *H04M 1/725* (2006.01)
   *H04W 12/00* (2009.01)
   *H04L 29/06* (2006.01)

(56) References Cited

U.S. PATENT DOCUMENTS

| | | | |
|---|---|---|---|
| 9,946,298 B2* | 4/2018 | Chang | G06F 1/163 |
| 9,965,044 B2* | 5/2018 | Chen | G06F 1/163 |
| 2004/0001097 A1* | 1/2004 | Zngf | G06F 3/014 |
| | | | 715/773 |
| 2005/0009584 A1* | 1/2005 | Park | H04B 1/385 |
| | | | 455/575.6 |
| 2007/0055949 A1* | 3/2007 | Thomas | G06F 3/014 |
| | | | 715/863 |
| 2009/0146947 A1* | 6/2009 | Ng | G06F 3/014 |
| | | | 345/156 |
| 2010/0156787 A1* | 6/2010 | Katayama | G02B 27/017 |
| | | | 345/157 |
| 2011/0248914 A1* | 10/2011 | Sherr | G06F 3/014 |
| | | | 345/156 |
| 2012/0188158 A1 | 7/2012 | Tan et al. | |
| 2013/0190903 A1 | 7/2013 | Balakrishnan et al. | |
| 2013/0265229 A1 | 10/2013 | Forutanpour et al. | |
| 2013/0346168 A1 | 12/2013 | Zhou et al. | |
| 2014/0002353 A1 | 1/2014 | Lim et al. | |
| 2014/0055343 A1* | 2/2014 | Kim | G06F 3/005 |
| | | | 345/156 |
| 2014/0055352 A1* | 2/2014 | Davis | G06F 3/017 |
| | | | 345/156 |
| 2014/0160055 A1 | 6/2014 | Margolis et al. | |
| 2014/0240103 A1 | 8/2014 | Lake et al. | |
| 2014/0317028 A1 | 10/2014 | Turgeman et al. | |
| 2015/0103011 A1* | 4/2015 | Large | G03H 1/0005 |
| | | | 345/168 |
| 2015/0109151 A1* | 4/2015 | Page | G06F 3/0235 |
| | | | 341/22 |
| 2015/0185838 A1* | 7/2015 | Camacho-Perez | G06F 3/014 |
| | | | 345/156 |
| 2015/0220158 A1* | 8/2015 | Elangovan | G06F 3/017 |
| | | | 345/156 |
| 2015/0301606 A1 | 10/2015 | Andrei | |
| 2015/0309582 A1 | 10/2015 | Gupta | |
| 2015/0323998 A1* | 11/2015 | Kudekar | G06F 1/163 |
| | | | 345/156 |
| 2015/0324000 A1* | 11/2015 | Park | G06F 3/014 |
| | | | 345/156 |
| 2015/0362999 A1 | 12/2015 | Kim et al. | |
| 2016/0057565 A1* | 2/2016 | Gold | H04L 67/12 |
| | | | 455/41.1 |
| 2016/0077581 A1* | 3/2016 | Shi | G06F 3/011 |
| | | | 340/12.5 |
| 2016/0124524 A1* | 5/2016 | Zhao | G06F 3/042 |
| | | | 345/175 |
| 2016/0165450 A1* | 6/2016 | Hunt | G06F 3/0412 |
| | | | 726/19 |
| 2016/0171780 A1* | 6/2016 | Vardi | G06T 19/006 |
| | | | 345/419 |
| 2016/0209928 A1* | 7/2016 | Kandur Raja | G06F 3/017 |
| 2016/0261834 A1* | 9/2016 | Li | G06F 3/03545 |
| 2016/0337346 A1* | 11/2016 | Momchilov | H04W 12/0023 |
| 2017/0003762 A1* | 1/2017 | Ishii | G06F 1/1698 |
| 2017/0090677 A1* | 3/2017 | Kaye | G06F 1/163 |
| 2017/0090747 A1* | 3/2017 | Dash | G06F 3/017 |
| 2017/0192525 A1* | 7/2017 | Hwang | G06F 3/018 |
| 2017/0242990 A1* | 8/2017 | Chien | G06F 21/32 |
| 2017/0251186 A1* | 8/2017 | Ku | G02B 26/101 |
| 2017/0285754 A1* | 10/2017 | Holman | G06F 1/163 |
| 2017/0351345 A1* | 12/2017 | Nirjon | G06F 3/014 |
| 2018/0014187 A1* | 1/2018 | Chan | G06F 3/017 |
| 2018/0181733 A1* | 6/2018 | Shim | G04G 21/08 |
| 2019/0196712 A1* | 6/2019 | Fallah | G06F 3/0482 |

OTHER PUBLICATIONS

International Search Report and Written Opinion dated Aug. 1, 2017 for International Application No. PCT/US2017/029394, 17 pages.
International Search Report and Written Opinion dated Sep. 21, 2016 for International Application No. PCT/US2015/067534, 9 pages.
Marcio Juliato, "Sensor Signal Processing to Determine Finger and/or Hand Position," U.S. Appl. No. 15/087,385, filed Mar. 21, 2016, 46 pages.
Intel Corporation, "System and Method to Collect Gesture Input Through Wrist Tendon and Muscle Sensing," Application No. PCT/US2015/067534; filed Dec. 22, 2015, 48 pages.
International Search Report and Written Opinion dated May 24, 2017for International Application No. PCT/US2017/019935, 12 pages.
International Preliminary Report on Patentability dated Oct. 11, 2018 for International Application No. PCT/US2017/019935, 9 pages.
Office Action dated Apr. 29, 2019 for U.S. Appl. No. 15/087,385, 22 pages.

* cited by examiner

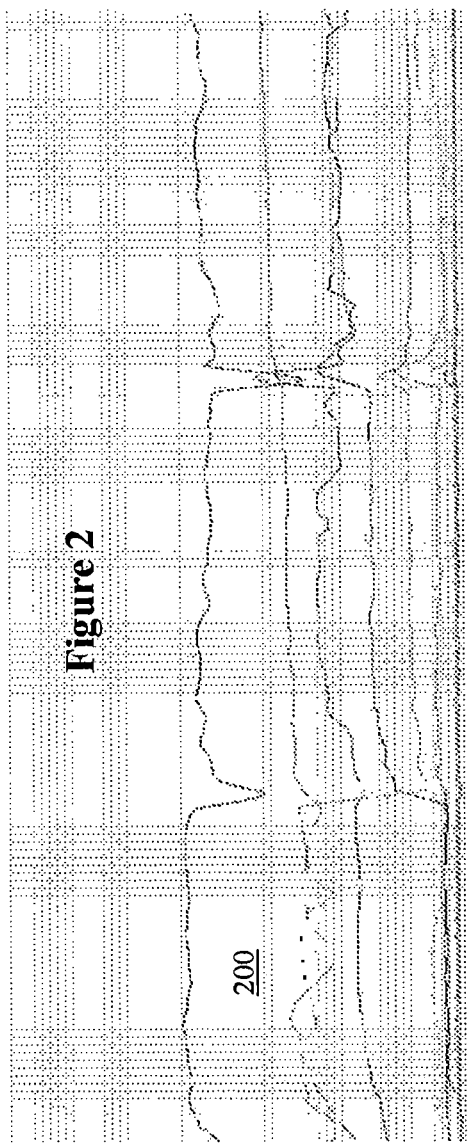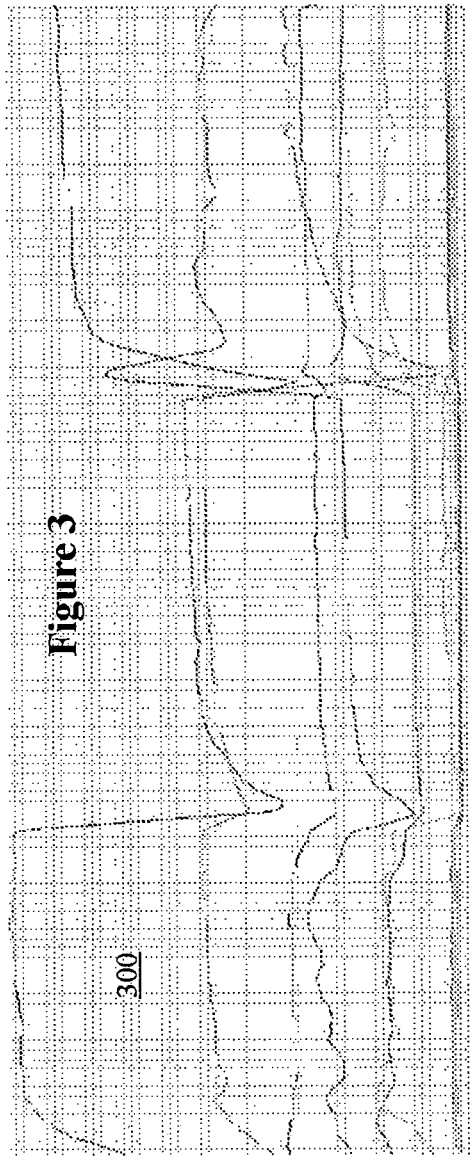

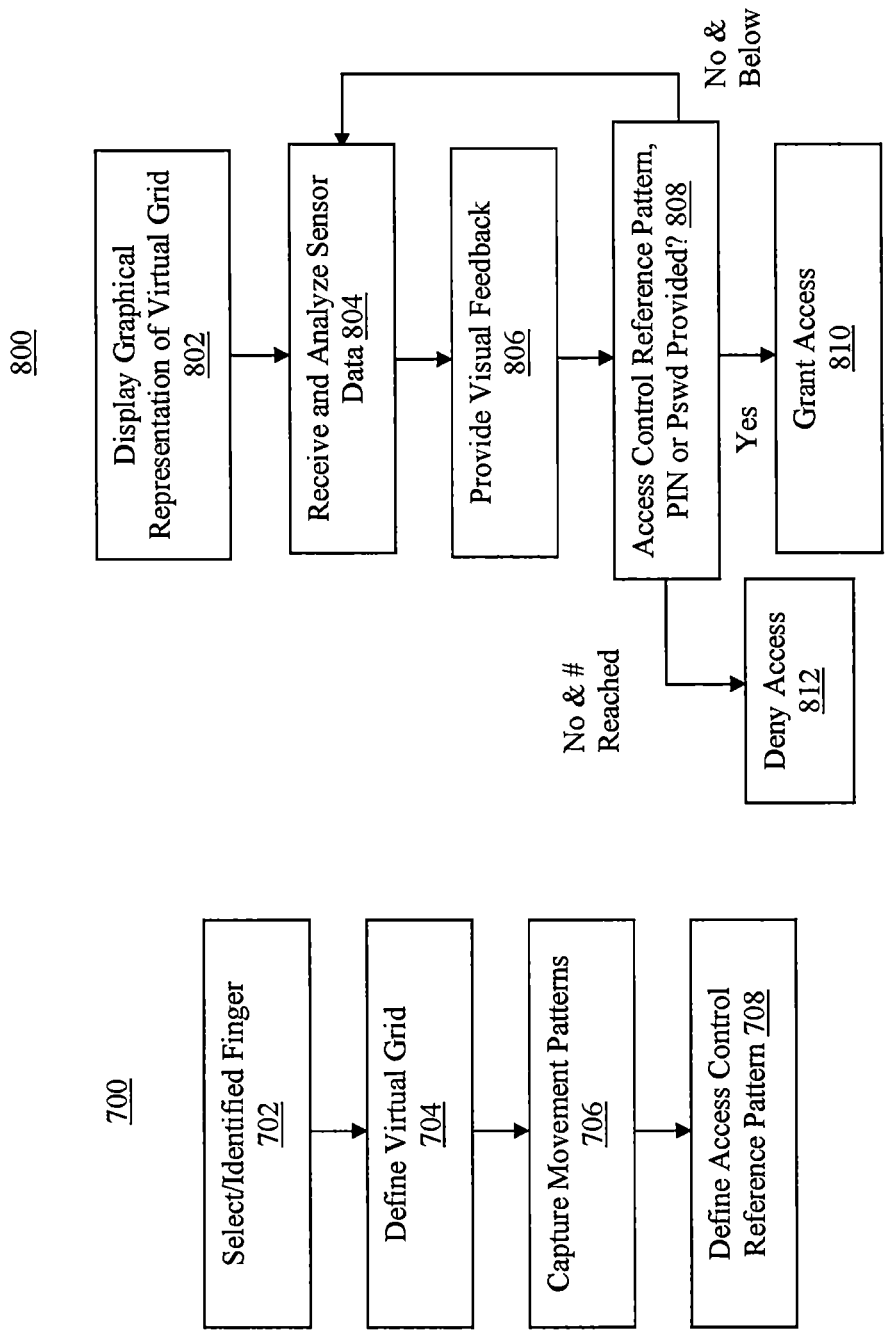

| TL | TC | TR |
|----|----|----|
| CL | CC | CR |
| BL | BC | BR |
| AL | AC | AR |

| 1 | 2 | 3 |
|---|---|---|
| 4 | 5 | 6 |
| 7 | 8 | 9 |
| Bksp | 0 | Enter |

WEARABLE COMPUTER APPARATUS WITH SAME HAND USER AUTHENTICATION

TECHNICAL FIELD

The present disclosure relates to the fields of computing. More specifically, the present disclosure is related to same hand user authentication, particularly suitable for wearable computer devices, such as smart watches, smartphones, and so forth.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits and computing technology, wearable computer devices, such as smart watches, are becoming increasingly popular. As with all computer devices, especially with recent increase in interest in privacy and data security, it is desirable or even necessary to authenticate a user before allowing a user to access a wearable computer device.

Previously, most mobile computer devices, such as smart phones use passwords, personal identification numbers (PIN) of 4 to 6 digits, or patterns traced on a displayed 3×3 dot matrix. The disadvantage in porting and employing these approaches on computer devices worn on the wrist, such as smart watches, is that these approaches require a hand to touch the screen of the wearable computer device to type in characters/numbers or form patterns. Necessarily, the hand touching the screen has to be the other hand opposite to the wrist wearing the computer device. Often times, the user's other hand may be busy, and thus require extra effort of the user to authenticate himself/herself before the user is able to gain access to the wearable computer device, and perform the desired function.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 2 and 3 illustrate two example sensor signal patterns for two example finger movements over a 3×3 virtual grid, in accordance with various embodiments.

FIGS. 7 and 8 illustrate example operation flow/algorithmic architecture of the user authentication module, in accordance to various embodiments.

FIGS. 9-11 illustrate an example 4×3 virtual grid suitable for pattern, PIN or password authentication, in accordance with various embodiments.

DETAILED DESCRIPTION

Figure 1:
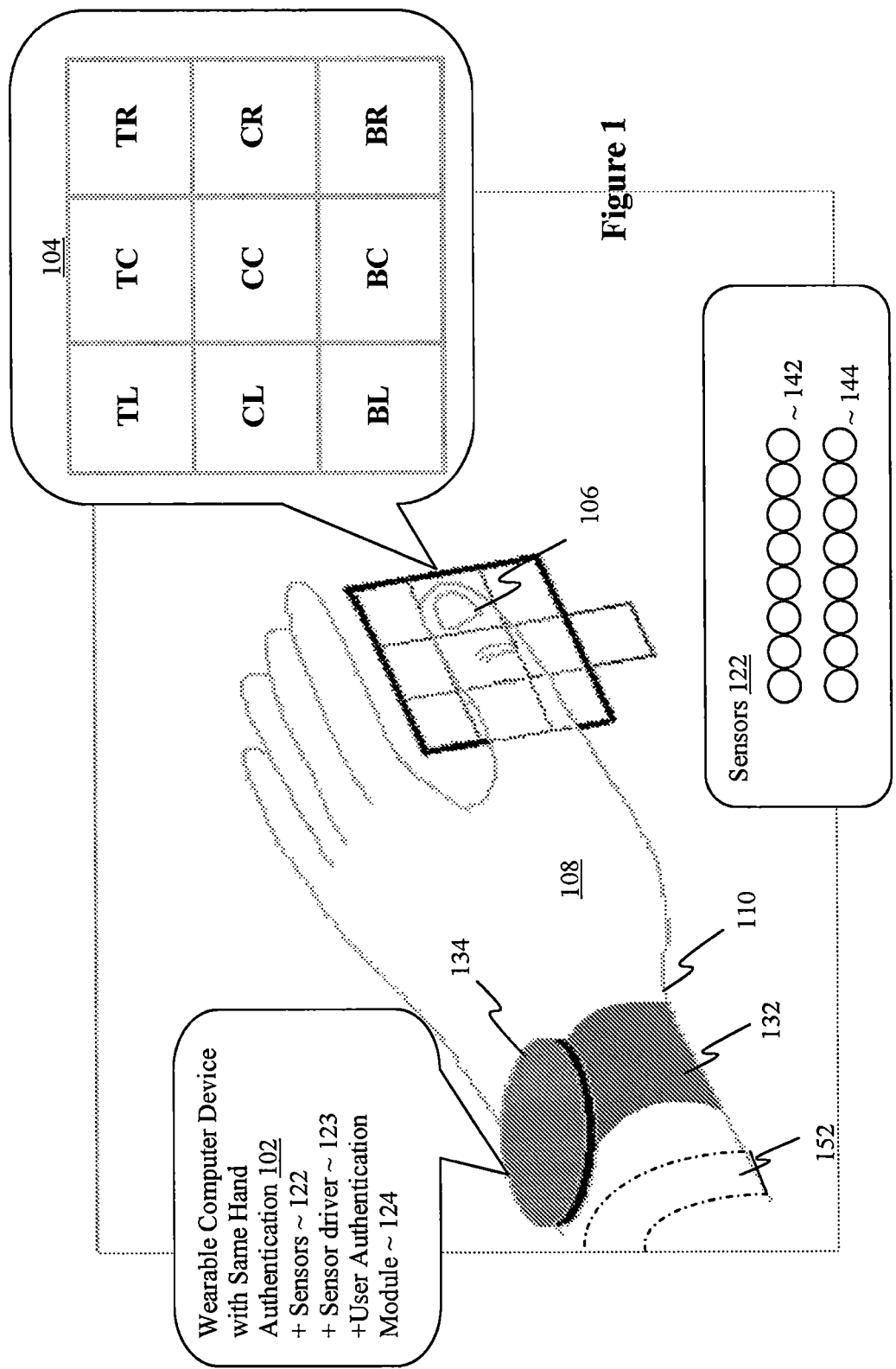
FIG. 1 illustrates a perspective view of a wearable computer device equipped with the same hand user authentication technology of the present disclosure, in accordance with various embodiments.

Apparatuses, methods and storage medium associated with same hand user authentication are disclosed herein. In embodiments, an apparatus, wearable on a user's wrist, may include a processor with one or more processor cores, and a user authentication module to be operated by the processor to authenticate and grant access to the user. To authenticate the user, the user authentication module may be configured to receive sensor data indicative of movements of one or more fingers over a virtual grid, analyze the sensor data to determine the movements, and authenticate and grant the user access or deny the user access to the apparatus based at least in part on a result of the analysis. The one or more fingers are fingers of a hand of the user that adjoins the wrist on which the apparatus is worn, i.e. the same hand wearing the wearable computer device. In embodiments, the sensor data may include sensor data collected by sensors configured to measure tendon/muscle positions of the wrist on which the apparatus is worn.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a perspective view of a wearable computer device having the same hand user authentication technology of the present disclosure, in accordance with various embodiments, is illustrated. As shown, in the illustrated embodiments, a user wearing a computer device 102, such as a smart watch or a smartphone, equipped with the same hand user authentication technology of the present disclosure, may authenticate himself/herself and gain access to wearable computer device 102, by moving a finger 106 over a virtual grid 104 forming a pattern that corresponds to or matches an access control reference pattern. As depicted, finger 106 may be a finger of the same hand 108 adjoining wrist 110, on which computer device 102 is worn. And virtual gird 104 may be an imaginary grid in free space. Accordingly, the user may authenticate himself/herself and gain access to computer device 102 (to perform a function) in a single handed or same hand manner, without the need of using the other hand.

In embodiments, as depicted in the callout on the left side of FIG. 1, wearable computer device 102 may include a number of sensors 122, sensor driver 123, and a user authentication module 124, configured to cooperate with each other to provide the single-handed or same hand user authentication capabilities. More specifically, sensors 122 may be configured to continuously sense the positions of tendons and muscles around wrist 110, wherein computer device 102 is worn, and continuously output signals representative of the positions sensed. Sensor driver 123 may be configured to process the signals, and continuously output sensor data indicative of successive positions sensed. User authentication module 124 may in turn receive these sensor data, and analyze the sensor data to determine movements of user finger 106 over virtual grid 104 and the pattern formed by the movements. Note that finger 106 is of the same hand adjoining wrist 110 where computer device 102 is worn. Further, user authentication module 124 may determine whether the pattern formed corresponds to or matches with an access control reference pattern, and authenticate and grant the user access to computer device 102, or deny access, based at least in part on the a result of the analysis against the access control reference pattern.

In embodiments, as illustrated by the insert at the lower center portion of FIG. 1, sensors 122 may comprise of two strips or rows of pressure sensors 142 and 144. Sensors 142 may be configured to continuously sense positions of tendons/muscles at wrist 110 through the upper (or anterior) surface of wrist 110 and output corresponding signals, whereas sensors 144 may be configured to sense positions of tendons/muscles at wrist 110 through the under (or posterior) surface of wrist 110 and output corresponding signals. Sensor driver 123 processes and combines both sets of signals to output sensor data indicative of the positions of the tendons/muscles at wrist 110. User authentication module 124 in turn processes the sensor data to determine the position and movement of finger 106 over virtual grid 104. In embodiments, user authentication module 124 may be configured to determine the position and movement of finger 106 over virtual grid 104, using a set of reference sensor data patterns for various movements over virtual grid 104. The sensing of positions of tendons/muscles through the upper (or anterior) and the under (or posterior) surfaces, and usage of such sensed signals to determine finger and/or hand position are described further in U.S. patent application Ser. No. 15/087,385, filed Mar. 31, 2016, entitled "Sensor Signal Processing to Determine Finger and/or Hand Position"; and in PCT Patent Application PCT/US2015/067534, filed Dec. 22, 2015, entitled "System and Method to Collect Gesture Input Through Wrist Tendon and Muscle Sensing". The Specifications of U.S. patent Ser. No. 15/087,385 and PCT/US2015/067534 are fully incorporated herein by reference.

In embodiments where computer device 102 is a smart watch having main body 134 housing the electronics, and band 132 coupled to main body 134 at two opposite sides/ends of main body 134, sensors 142 may be disposed at a bottom surface of main body 134 that touches the upper (or anterior) surface of wrist 110, and sensors 144 may be disposed at a portion of band 132 that touches the under (or posterior) surface of wrist 110. In alternate embodiments, where computer device 102 is a smart watch having main body 134 housing the electronics, and band 132 coupled to main body 134, passing through and covering (at least partially) the underside of main body 134, sensors 142 may be disposed at a portion of band 132 that touches the upper (or anterior) surface of wrist 110, and sensors 144 may be disposed at a portion of band 132 that touches the posterior (or under) surface of wrist 110. In still other embodiments, regardless whether computer device 102 is a smart watch or other wearable computer devices, sensors 142 may be disposed at the internal portion of external band 152 (that is not part of computer device 102) that touches the upper (or anterior) surface of wrist 110, and sensors 144 may be disposed at the internal portion of external band 152 that touches the posterior (or under) surface of wrist 110.

In embodiments, as depicted by the callout in the upper right corner of FIG. 1, virtual grid 104 may be a 3×3 virtual grid, which may comprise 9 cells organized into 3 rows and 3 columns. The 9 cells may be referred to as the top left (TL) cell, top center (TC) cell, top right (TR) cell, center left (CL) cell, center (CC) cell, center right (CR) cell, bottom left (BL) cell, bottom center (BC) cell, and bottom right (BR) cell. In alternate embodiments, other nomenclature may be used instead.

Referring now also to FIGS. 2 and 3, wherein two example sensor signal patterns for two example movement patterns over the 3×3 virtual grid, in accordance with various embodiments, are shown. More specifically, FIG. 2 illustrates an example signal pattern 200 when thumb 106 is first placed at cell CL, traverse along the CL-CC-CR row to cell CC, then cell CR. Each line in FIG. 2 depicts the signal level of a corresponding sensor as thumb 106 moves from cell CL, along the CL-CC-CR row to cell CC, then cell CR. FIG. 3 illustrates an example signal pattern when thumb 106 is first placed at cell TC, traverse along the TC-CC-BC column to cell CC, then cell BC. Similarly, each line in FIG. 3 depicts the signal level of a corresponding sensor as thumb 106 moves from cell TC, along the TC-CC-BC column to cell CC, then cell BC.

Figure 4:
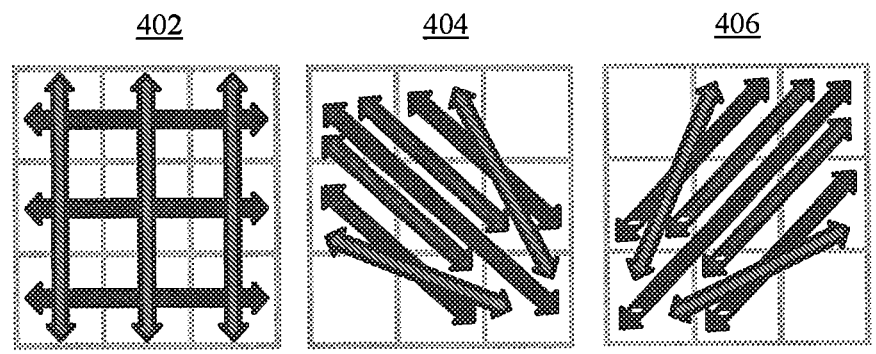
FIG. 4 illustrates possible finger movements across a 3×3 virtual grid, in accordance with alternate embodiments.

FIG. 4 illustrates possible finger movements across the 3×3 virtual grid, in accordance with various embodiments. As illustrated in the left portion 402 of FIG. 4, a user may also move finger 106 vertically, up and down any one of the columns of virtual grid 104, or horizontally, back and forth across any one of the rows of virtual grid 104. As illustrated in the center and right portions 404 and 406 of FIG. 4, a user may move finger 106 diagonally in any one of a number of angular manners across the various cells of virtual grid 104. In embodiments, during traversal of the 3×3 virtual grid, a cell within the 3×3 virtual grid may be selected with a pre-determined finger movement, while the finger is positioned over the cell. For example, in embodiments where the 3×3 virtual grid is traversed using the thumb, selection of a cell may be indicated by moving the thumb towards the palm while the thumb is position over the cell.

Referring back to FIG. 1, in embodiments, user authentication module 124 may be configured to support a configuration mode and an operation mode. The configuration mode may have various configuration points or periods, where different aspects of the single handed/same hand authentication technology of the present disclosure may be configured/defined. In embodiments, these configuration points or periods may include a point where finger 106 to be used to perform the pattern traversal may be selected/identified, and a first period where the free space occupied by virtual grid 102 (and its cells) may be defined. Further, these configuration points or periods may include a second period where the signal patterns for various movements of finger 106 over virtual grid 102 may be recorded, and a third period where the reference pattern to be used to control access to computer device 102 may be defined.

In embodiments, at the finger selection/identification point in the configuration process, finger 106 to be used to perform the pattern traversal may be selected/identified through movement of one of the fingers. For example, a user may move the finger he/she wants to use to traverse virtual grid 104, in response to a prompt from user authentication module 122. During the virtual grid definition period of the configuration process, the free space occupied by virtual grid 102 may be defined through movement of the selected/identified finger 106. For example, a user may use the selected/identified finger 106 to trace the perimeter of virtual grid 102, in response to a prompt from user authentication module 122. Further, the number of cells within the virtual grid may be defined. For example, a user may enter (type in, via voice command, or select from pre-selected options) the configuration or the number of cells, or use the selected/identified finger 106 to partition virtual grid 102, in response to a prompt from user authentication module 122. And the free space occupied by the cells may be computed from the free space defined for virtual grid 104. For example, for a 3×3 virtual grid, the free space occupied by the cells may be computed by dividing the free space defined for virtual grid 104 into 9 equal portions in a 3×3 configuration.

Likewise, during the signal pattern recording period of the configuration process, the signal patterns for various movements of finger 106 may be captured. For example, a user may use the selected/identified finger 106 to move vertically, horizontally or diagonally across virtual grid 104, in response to various prompts by user authentication module 124. During the reference pattern definition period of the configuration process, the reference pattern to be used to control access to computer device 102 may be defined through movement of the selected/identified finger 106 over virtual grid 104. For example, a user may use the selected/identified finger 106 to traverse virtual grid 102, in response to a prompt from user authentication module 122.

In embodiments, the different configuration point/periods to select/identify finger 106, define virtual grid 104, record the signal patterns, or define the reference pattern may be consecutive, with the selection/identification and recording/definitions being performed successive, or may be entered independently to allow any of these selection/identification, recordings and definitions to be performed and/or repeated (e.g., periodic changing the access control reference pattern).

In embodiments, the identification of finger 106, the free space definition of virtual grid 104, the movement signal patterns recorded, and the access control reference pattern defined may be stored locally in wearable computer device 102. Alternatively the identification of finger 106, the free space definition of virtual grid 104, the movement signal patterns recorded, and/or the access control reference pattern defined may be stored in a cloud server (not shown), accessible to wearable computer device 102, e.g., through wireless communication.

In alternate embodiments, other approaches may be employed to select/identify finger 106, define virtual grid 104, capture signal patterns for various finger movements, and/or define the access control reference pattern. The particular embodiments described should not be construed as limiting on the single handed/same hand user authentication technology of the present disclosure.

Additionally, it should be noted that while a 3×3 virtual grid and usage of the thumb as the traversing figure are depicted in FIG. 1, in alternate embodiments, virtual grid of other configurations, e.g., 4×3 virtual grid, and other fingers, such as the index finger, the middle finger, the ring finger, the baby finger, or usage of multiple fingers may be practiced instead. Further, while a smart watch with two stripes/rows of sensors are depicted in FIG. 1, in alternate embodiments, other wearable computer device and/or other configuration of sensor dispositions may be practiced instead. Still further, for smart watch embodiments, while a smart watch with a round main body/housing is illustrated, in alternate embodiments, the main body/housing of smart watch may have other shapes, e.g. a rectangular shape. Again, these illustrative embodiments should not be construed as limiting on the single handed/same hand user authentication technology of the present disclosure.

Figure 5:
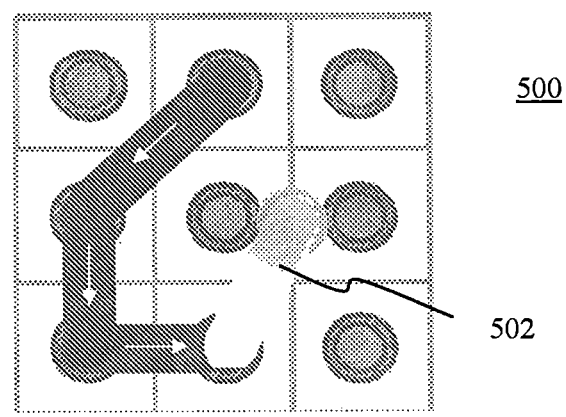
FIG. 5 illustrates example feedback by the wearable computer device, in accordance with various embodiments.

In embodiments, user authentication module 124 may also be configured to provide feedback to the user, as the user endeavors to use finger 106 to traverse virtual grid 104 with movements to form a pattern that corresponds or matches an access control reference pattern, to authenticate himself/herself to gain access to wearable computer device 102. FIG. 5 illustrates example feedback by a wearable computer device, in accordance with various embodiments. As shown, in response to a particular predetermined movement of hand 108 or finger 106 that signal the user's desire to authenticate himself/herself to gain access, wearable computer device 102 may wake up from an idle or sleep state, enter the operation mode, and render display 500 that graphically or pictorially represents virtual grid 104. As the user moves finger 106 to form a pattern that corresponds or matches the access control reference pattern, the movement path 502, as interpreted/determined by user authentication module 124 may also be displayed for the user. Accordingly, the user may be aided in his/her endeavor to provide the corresponding/matching pattern to gain access. In embodiments, similar visual feedbacks may be provided to the user during the configuration mode, for recording the signal patterns of various finger movements and/or for inputting the access control reference pattern.

Figure 6:
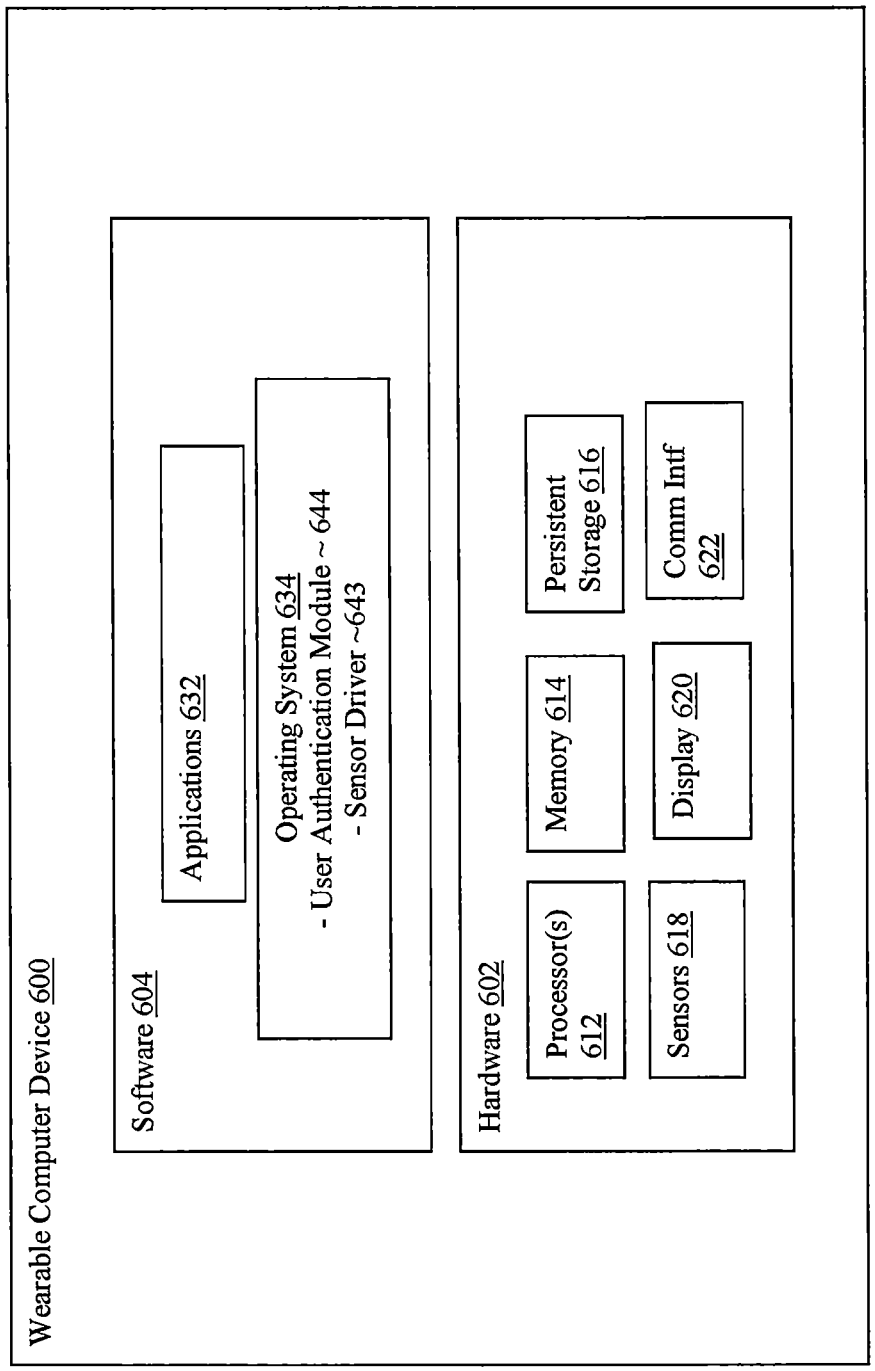
FIG. 6 illustrates example architecture of the wearable computer device, in accordance to various embodiments.

Referring now to FIG. 6, wherein example architecture of a wearable computer device having the single handed/same hand technology of the present disclosure, according to various embodiments, is shown. As illustrated, in embodiments, wearable computer device 600 (which may be wearable computer device 102) may include hardware 602 and software 604. Software 604 may include operating system (OS) 634 and application 632. OS 634 may include user authentication module 644 and sensor driver 643, which may correspond to the earlier described user authentication module 144 and sensor driver 143. OS 634, except for user authentication module 644 and sensor driver 643, may be any one of a number of wearable computer device OS known in art. Alternatively to an OS, user authentication module 644 can conceived as a firmware or any other kind of embedded software dedicated to perform dedicated tasks. Applications 632 may likewise be any one of a number of known applications for wearable computer devices, e.g., personal health application, calendar or other personal information management (PIM) applications.

Hardware 602 may include processor(s) 612, memory 6144, persistent storage 616, sensors 618, display 620, and communication interface 622. Processor(s) 612 may be any one of a number of processors known in the art, each having one or more processor cores. Memory 614 may be any known volatile or non-volatile memory in the art, suitable for storing instructions for execution and working data, in particular, instructions and data of applications 632 and OS 634, including user authentication module 644 and sensor driver 643. Memory 614 may include a hierarchy of cache memory and system memory. Both the cache and system memory may be respectively organized into segments and pages. Persistent storage 616 may be any known persistent mass storage suitable for providing persistent storage of instructions and data of applications 632 and OS 634, e.g., solid state storage, magnetic or optical disk drives. Sensors 618 may include the earlier described sensors 142 and 144 for sensing position of tendons/muscles. Display 620 may be any known display device, including e.g., touch sensitive screen. Communication interface 622 may include any number of wireless communication or networking interfaces known, such as WiFi, 3G/4G, Bluetooth®, Near Field Communication, LiFi, and so forth.

Referring now to FIGS. 7 and 8, wherein example operation flow/algorithmic structure of the user authentication module, according the various embodiments, is shown. As illustrated in FIG. 7, in embodiments, user authentication module 144/642 may be configured with operating flow/algorithmic structure 700 for configuring various aspects of the single handed/same hand user authentication technology. Operating flow/algorithmic structure 700 may begin at/with block 702. At block 702, the finger to be used to traverse the virtual grid to provide the access control authentication may be selected/identified. As described earlier, a prompt may be made of the user to move the finger to be used to traverse the virtual grid to provide the access control pattern.

Next at block 704, the virtual grid may be defined. As described earlier, a prompt may be made of the user to move the finger to trace the free space to define the perimeter of the virtual grid. Further, a prompt may be made of the user to identify the configuration or cells of the virtual grid.

Next at block 706, on definition of the virtual grid, the sensor signal patterns of the various finger movement patterns over the virtual grid may be recorded. As described earlier, a number of prompts may be made of the user to move the finger horizontally across various rows, vertically up and down various columns, and diagonally/angularly across various cells of the virtual grid.

Then, at block 708, the access control reference pattern may be defined. As described earlier, a prompt may be made of the user to move the finger over the virtual grid to define the access control reference pattern.

As illustrated in FIG. 8, in embodiments, user authentication module 144/642 may be configured with operating flow/algorithmic structure 800 for authenticating and granting access to the wearable computer device to a user or denying access to the wearable computer device to the user. Operating flow/algorithmic structure 800 may begin at/with block 802. At block 802, on entry into an operational mode (from an idle/sleep state), a graphical representation of the virtual grid may be displayed.

Next at block 804, sensor data indicative of positions of tendons/muscles of the wrist on which the computer device is worn, may be received and analyzed to determine the finger position over the virtual grid. At block 806, on determination of the current finger position over the virtual grid, visual feedback on the movement path may be provided.

At block 808, a determination may be made on whether the movement path provided thus far corresponds or matches the access control reference pattern. If a result of the determination indicates that the movement path provided thus far corresponds or matches the access control reference pattern, operation/algorithm flow 800 may proceed to block 810. At block 810, the user may be authenticated, and access to the wearable computer device granted.

If a result of the determination indicates that the movement path provided thus far does not correspond or match the access control reference pattern, and the number of cells touched is below the number of cells needed to provide the corresponding or matching access control pattern, operation/algorithm flow 800 may return to block 804 and continue there from for additional sensor data.

If a result of the determination indicates that the movement path provided thus far does not correspond or match the access control reference pattern, and the number of cells touched has reached the number of cells needed to provide the corresponding or matching access control pattern, operation/algorithm flow 800 may proceed to block 812. At block 812, visual feedback, such as an error message and/or an alarm, may be provided to convey authentication failure, and access to the wearable computer device denied.

Figure 11:
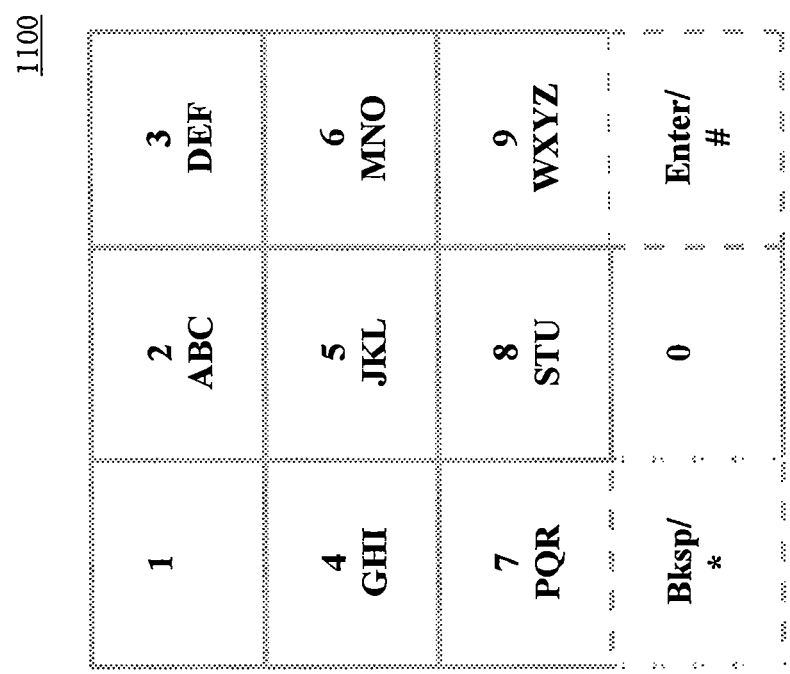

As alluded to earlier, while for ease of understanding, the single handed/same hand user authentication technology has been described in the context of a 3×3 virtual grid thus far. In alternate embodiments, different grid configurations and/or personal identification number (PIN) or password (as opposed to patterns) may be practiced to authenticate and grant access to the user. FIGS. 9-11 illustrate an example 4×3 virtual grid suitable for PIN or password authentication, in accordance with various embodiments. As shown in FIG. 9, 4×3 virtual grid 900 may comprise 4 rows and 3 columns. In embodiments, the cells of the top three rows may be similarly referred to as TL, TC, TR, CL, CC, CR, BL, BC and BR as before. The cells of the $4^{th}$ row may be respectively referred to as cell AL, AC and AR.

In embodiments, user authentication module 144/644 may interpret the 12 cells as a 12-keys numeric keypad 1000 (FIG. 10), with cells TL, TC and TR correspond to the numbers 1, 2 and 3; cells CL, CC and CR correspond to the numbers 4, 5, and 6; cells BL, BC and BR correspond to the numbers 7, 8 and 9, and cell AC corresponds to the number 0. Further, cells AL and AR may respectively correspond to special keys Backspace or asterisk (*), and Enter or #.

In embodiments, user authentication module 144/644 may support multi-tap allowing the 12 cells to be interpreted as 12-keys alphanumeric keypad 1100 (FIG. 11). For example, a single tap of cell TC may correspond to the letter "A," two taps may correspond to the letter "B," three taps may correspond to the letter "C," and so forth. Accordingly, cells TC and TR may respectively correspond to letters "ABC" and "DEF," cells CL, CC and CR may respectively correspond to letters "GHI," "JKL," and "MNO," cells BL, BC and BR may respectively correspond to letters "PQR," "STU," and "WXYZ."

Thus, for these embodiments, during operation, similar to block 808 of FIG. 8, a determination may be made on whether the movement path provided thus far corresponds or matches an access PIN or password. If a result of the determination indicates that the movement path provided thus far corresponds or matches the access PIN or password, the user may be authenticated, and access to the wearable computer device granted. On the other hand, if a result of the determination indicates that the movement path provided thus far does not correspond or match the access PIN or password, and the number of cells touched is below the number of cells needed to provide the corresponding or matching PIN or password, additional sensor data may be collected. However, if a result of the determination indicates that the movement path provided thus far does not correspond or match the access PIN or password, and the number of cells touched has reached the number of cells needed to provide the corresponding or matching access PIN or password, visual feedback, such as an error message and/or an alarm, may be provided to convey authentication failure, and access to the wearable computer device denied.

Further, similar to the access pattern embodiments, user authentication module 144/644 may provide visual feedback similar to the graphical representation illustrated in FIG. 5, as the various keys are touched or tapped to provide the access control PIN or password.

Referring back to FIG. 6, in one embodiment, at least one of processors 612 may be packaged together with a computer-readable storage medium having sensor driver 643 and/or user authentication module 644 (in lieu of storage in memory 614 and/or storage 616). For one embodiment, at least one of processors 612 may be packaged together with a computer-readable storage medium having sensor driver 643 and/or user authentication module 644 to form a System in Package (SiP). For one embodiment, at least one of processors 612 may be integrated on the same die with a computer-readable storage medium having sensor driver 643 and/or user authentication module 644. For one embodiment, at least one of processors 612 may be packaged together with a computer-readable storage medium having sensor driver 643 and/or user authentication module 644 to form a System on Chip (SoC).

Thus, example embodiments described may include:

Example 1 may be an apparatus for computing, comprising: a processor having one or more processor cores; and a user authentication module to be operated by the processor to authenticate and grant access to a user of the apparatus. The apparatus may be wearable on a user's wrist. To authenticate the user, the user authentication module may be configured to receive sensor data indicative of movements of one or more fingers over a virtual grid, analyze the sensor data to determine the movements, and authenticate and grant the user access or deny the user access to the apparatus based at least in part on a result of the analysis. The one or more fingers are fingers of a hand of the user that adjoins the wrist on which the apparatus is worn.

Example 2 may be example 1, wherein the virtual grid may comprise a 3×3 virtual grid, and the user authentication module may be configured to authenticate and grant access to the user in response to a determination of the movements over the virtual grid matching a reference pattern.

Example 3 may be example 1, wherein the virtual grid may comprise a 4×3 virtual keypad, and the user authentication module may be configured to authenticate and grant access to the user in response to a determination of the movements over the virtual grid matching a reference pattern, a personal information number (PIN) or a password.

Example 4 may be example 1, wherein the one or more fingers may comprise a thumb of the hand of the user that adjoins the wrist on which the apparatus is worn.

Example 5 may be example 1, further comprising a sensor driver to be operated by the processor to receive sensor signals representative of tendon or muscle positions of the wrist, and process the sensor signals to output the sensor data for the user authentication module.

Example 6 may be example 5, wherein the apparatus may further comprise a plurality of sensors coupled to the processor to sense and output the senor signals representative of the tendon or muscle positions of the wrist.

Example 7 may be example 6, wherein the apparatus may be a smart watch having a watch band, and the plurality of sensors may be disposed on the watch band.

Example 8 may be example 5, wherein the apparatus may further comprise a communication interface to receive sensor signals from an external wrist band having a plurality of sensors to sense and output the senor signals representative of the tendon or muscle positions of the wrist, and process the sensor signals into the sensor data; wherein the external wrist band is not part of the apparatus.

Example 9 may be any one of examples 1-8, wherein the user authentication module may be configured to further provide visual feedbacks to the user to assist the user in traversing the virtual grid.

Example 10 may be example 9, wherein to provide visual feedbacks may comprise to display a graphical representation of the virtual grid, including indicators indicating portions of the virtual grid traversed.

Example 11 may be a method for computing, comprising: receiving, by a wearable computer device, sensor data indicative of movements of one or more fingers of a user of the wearable computer device over a virtual grid; analyzing, by the wearable computer device, the sensor data to determine the movements; and authenticating and granting the user access or denying the user access to the wearable computer device, based at least in part on a result of the analysis. The one or more fingers are fingers of a hand of the user that adjoins the wrist on which the wearable computer device is worn.

Example 12 may be example 11, wherein the virtual grid may comprise a 3×3 virtual grid, and authenticating and granting access may comprise authenticating and granting access to the user in response to a determination of the movements over the virtual grid matching a reference pattern.

Example 13 may be example 11, wherein the virtual grid may comprise a 4×3 virtual keypad, authenticating and granting access may comprise authenticating and granting access to the user in response to a determination of the movements over the virtual grid matching a reference pattern, a personal information number (PIN) or a password.

Example 14 may be example 11, wherein the one or more fingers may comprise a thumb of the hand of the user that adjoins the wrist on which the apparatus is worn.

Example 15 may be example 11, wherein receiving may comprise receiving sensor signals representative of tendon or muscle positions of the wrist, and processing the sensor signals to output the sensor data.

Example 16 may be example 15, further comprising sensing and outputting the senor signals representative of the tendon or muscle positions of the wrist.

Example 17 may be example 16, wherein the wearable computer device may be a smart watch having a watch band, and the plurality of sensors may be disposed on the watch band.

Example 18 may be example 15, wherein receiving may comprise receiving sensor signals from an external wrist band having a plurality of sensors to sense and output the sensor signals representative of the tendon or muscle positions of the wrist, and processing the sensor signals into the sensor data; wherein the external wrist band is not part of the apparatus.

Example 19 may be any one of examples 11-18, further comprising providing, by the wearable computer device, visual feedbacks to the user to assist the user in traversing the virtual grid.

Example 20 may be example 19, wherein providing visual feedbacks may comprise displaying a graphical representation of the virtual grid, including indicators indicating portions of the virtual grid traversed.

Example 21 may be one or more computer-readable media comprising instructions that cause a computer device, in response to execution of the instructions by one or more processor cores of the computer device, to provide a user authentication module to authenticate and grant access to a user of the apparatus; wherein the apparatus is wearable on a user's wrist; wherein to authenticate the user, the user authentication module may be configured to receive sensor data indicative of movements of one or more fingers over a virtual grid, analyze the sensor data to determine the movements, and authenticate and grant the user access or deny the user access to the computer device based at least in part on a result of the analysis; and wherein the one or more fingers are fingers of a hand of the user that adjoins the wrist on which the apparatus is worn.

Example 22 may be example 21, wherein the virtual grid may comprise a 3×3 virtual grid, and the user authentication module may be configured to authenticate and grant access to the user in response to a determination of the movements over the virtual grid matching a reference pattern.

Example 23 may be example 21, wherein the virtual grid may comprise a 4×3 virtual keypad, and the user authentication module may be configured to authenticate and grant access to the user in response to a determination of the movements over the virtual grid matching a reference pattern, a personal information number (PIN) or a password.

Example 24 may be example 21, wherein the one or more fingers may comprise a thumb of the hand of the user that adjoins the wrist on which the apparatus is worn.

Example 25 may be example 21, further comprising a sensor driver to be operated by the processor to receive sensor signals representative of tendon or muscle positions of the wrist, and process the sensor signals to output the sensor data for the user authentication module.

Example 26 may be example 25, wherein the computer device may further comprise a plurality of sensors coupled to the processor cores to sense and output the senor signals representative of the tendon or muscle positions of the wrist.

Example 27 may be example 26, wherein the computer device is a smart watch having a watch band, and the plurality of sensors may be disposed on the watch band.

Example 28 may be example 25, wherein the computer device may further comprise a communication interface to receive sensor signals from an external wrist band having a plurality of sensors to sense and output the senor signals representative of the tendon or muscle positions of the wrist, and process the sensor signals into the sensor data; wherein the external wrist band is not part of the apparatus.

Example 29 may be any one of examples 21-28, wherein the user authentication module may be configured to further provide visual feedbacks to the user to assist the user in traversing the virtual grid.

Example 30 may be example 29, wherein to provide visual feedbacks may comprise to display a graphical representation of the virtual grid, including indicators indicating portions of the virtual grid traversed.

Example 31 may be a wearable apparatus for computing, comprising: means for receiving sensor data indicative of movements of one or more fingers of a user of the wearable apparatus over a virtual grid; means for analyzing the sensor data to determine the movements; and means for authenticating and granting the user access or denying the user access to the wearable apparatus, based at least in part on a result of the analysis; and wherein the one or more fingers are fingers of a hand of the user that adjoins the wrist on which the wearable computer device is worn.

Example 32 may be example 31, wherein the virtual grid may comprise a 3×3 virtual grid, and means for authenticating and granting access may comprise means for authenticating and granting access to the user in response to a determination of the movements over the virtual grid matching a reference pattern.

Example 33 may be example 31, wherein the virtual grid may comprise a 4×3 virtual keypad, and means for authenticating and granting access may comprise means for authenticating and granting access to the user in response to a determination of the movements over the virtual grid matching a reference pattern, a personal information number (PIN) or a password.

Example 34 may be example 31, wherein the one or more fingers comprise a thumb of the hand of the user that adjoins the wrist on which the wearable apparatus is worn.

Example 35 may be example 31, wherein means for receiving may comprise means for receiving sensor signals representative of tendon or muscle positions of the wrist, and means for processing the sensor signals to output the sensor data.

Example 36 may be example 35, may further comprise means for sensing and outputting the senor signals representative of the tendon or muscle positions of the wrist.

Example 37 may be example 36, wherein the wearable computer device may be a smart watch having a watch band, and the means for sensing may comprise a plurality of sensors disposed on the watch band.

Example 38 may be example 35, wherein means for receiving sensor signals may comprise means for receiving sensor signals from an external wrist band having a plurality of sensors to sense and output the sensor signals representative of the tendon or muscle positions of the wrist, and processing the sensor signals into the sensor data; wherein the external wrist band is not part of the wearable apparatus.

Example 39 may be any one of examples 31-38, further comprising means for providing visual feedbacks to the user to assist the user in traversing the virtual grid.

Example 40 may be example 39, wherein means for providing visual feedbacks may comprise means for displaying a graphical representation of the virtual grid, including indicators indicating portions of the virtual grid traversed.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
a processor having one or more processor cores; and
a user authentication module to be operated by the processor to authenticate and grant access to a user of the apparatus;
wherein the apparatus is wearable on a user's wrist;
wherein to authenticate the user, the user authentication module is to receive sensor data indicative of movements of one or more fingers over an imaginary virtual grid, analyze the sensor data to determine the movements, and authenticate and grant the user access or deny the user access to the apparatus based at least in part on a result of the analysis; and
wherein the one or more fingers moving over the imaginary virtual grid are at least partially forward extended fingers of a hand of the user that adjoins the wrist on which the apparatus is worn, and the imaginary virtual grid is disposed in free space proximal to the one or more at least partially forward extended fingers.

2. The apparatus of claim 1, wherein the imaginary virtual grid comprises a 3×3 imaginary virtual grid, and the user authentication module is to authenticate and grant access to the user in response to a determination of the movements over the imaginary virtual grid matching a reference pattern.

3. The apparatus of claim 1, wherein the imaginary virtual grid comprises a 4×3 inginary virtual keypad, and the user authentication module is to authenticate and grant access to the user in response to a determination of the movements over the imaginary virtual grid matching a reference pattern, a personal information number (PIN) or a password.

4. The apparatus of claim 1, wherein the one or more at least partially forward extended fingers moving over the imaginary virtual grid comprise an at least partially forward extended thumb of the hand of the user that adjoins the wrist on which the apparatus is worn, and the imaginary virtual grid is disposed in free space proximal to the at least partially forward extended thumb.

5. The apparatus of claim 1, further comprising a sensor driver to be operated by the processor to receive sensor signals representative of tendon or muscle positions of the wrist, and process the sensor signals to output the sensor data for the user authentication module.

6. The apparatus of claim 5, wherein the apparatus further comprises a plurality of sensors coupled to the processor to sense and output the senor signals representative of the tendon or muscle positions of the wrist.

7. The apparatus of claim 6, wherein the apparatus is a smart watch having a watch band, and the plurality of sensors are disposed on the watch band.

8. The apparatus of claim 5, wherein the apparatus further comprises a communication interface to receive sensor signals from an external wrist band having a plurality of sensors to sense and output the senor signals representative of the tendon or muscle positions of the wrist, and process the sensor signals into the sensor data; wherein the external wrist band is not part of the apparatus.

9. The apparatus of claim 1, wherein the user authentication module is to further provide visual feedbacks to the user to assist the user in traversing the imaginary virtual grid.

10. The apparatus of claim 9, wherein to provide visual feedbacks comprises to display a graphical representation of the imaginary virtual grid, including indicators indicating portions of the imaginary virtual grid traversed.

11. A method for computing, comprising:
receiving, by a wearable computer device, sensor data indicative of movements of one or more at least partially forward extended fingers of a user of the wearable computer device over an imaginary virtual grid;
analyzing, by the wearable computer device, the sensor data to determine the movements; and
authenticating and granting the user access or denying the user access to the wearable computer device, based at least in part on a result of the analysis; and
wherein the one or more at least partially forward extended fingers moving over the imaginary virtual grid are fingers of a hand of the user that adjoins a wrist on which the wearable computer device is worn, and the imaginary virtual grid is disposed in free space proximal to the one or more at least partially forward extended fingers.

12. The method of claim 11, wherein the imaginary virtual grid comprises a 3×3 imaginary virtual grid, and authenticating and granting access comprises authenticating and granting access to the user in response to a determination of the movements over the imaginary virtual grid matching a reference pattern.

13. The method of claim 11, wherein the imaginary virtual grid comprises a 4×3 virtual keypad, authenticating and granting access comprises authenticating and granting access to the user in response to a determination of the movements over the imaginary virtual grid matching a reference pattern, a personal information number (PIN) or a password.

14. The method of claim 11, wherein the one or more fingers moving over the imaginary virtual grid comprise an at least partially forward extended thumb of the hand of the user that adjoins the wrist on which the wearable computer device is worn, and the imaginary virtual grid is disposed in free space proximal to the thumb.

15. The method of claim 11, wherein receiving comprises receiving sensor signals representative of tendon or muscle positions of the wrist, and processing the sensor signals to output the sensor data.

16. The method of claim 11, further comprising providing, by the wearable computer device, visual feedbacks to the user to assist the user in traversing the imaginary virtual grid; wherein providing visual feedbacks comprises displaying a graphical representation of the imaginary virtual grid, including indicators indicating portions of the imaginary virtual grid traversed.

17. One or more non-transitory computer-readable media comprising instructions that cause a computer device, in response to execution of the instructions by one or more processor cores of the computer device, to provide a user authentication module to authenticate and grant access to a user of an apparatus;
wherein the apparatus is wearable on a user's wrist;
wherein to authenticate the user, the user authentication module is to receive sensor data indicative of movements of one or more at least partially forward extended fingers over an imaginary virtual grid, analyze the sensor data to determine the movements, and authenticate and grant the user access or deny the user access to the computer device based at least in part on a result of the analysis; and wherein the one or more at least partially forward extended fingers moving over the imaginary virtual grid are at least partially forward extended fingers of a hand of the user that adjoins the wrist on which the apparatus is worn, and the imaginary virtual grid is disposed in free space proximal to the one or more at least partially forward extended fingers.

18. The one or more non-transitory computer-readable media of claim 17, wherein the imaginary virtual grid comprises a 3×3 imaginary virtual grid, and the user authentication module is to authenticate and grant access to the user in response to a determination of the movements over the imagrinary virtual grid matching a reference pattern.

19. The one or more non-transitory computer-readable media of claim 17, wherein the imaginary virtual grid comprises a 4×3 virtual keypad, and the user authentication module is to authenticate and grant access to the user in response to a determination of the movements over the imaginary virtual grid matching a reference pattern, a personal information number (PIN) or a password.

20. The one or more non-transitory computer-readable media of claim 17, wherein the one or more at least partially forward extended fingers moving over the imaginary virtual grid comprise an at least partially forward extended thumb of the hand of the user that adjoins the wrist on which the apparatus is worn, and the imaginary virtual grid is disposed in free space proximal to the at least partially forward extended thumb.

21. The one or more non-transitory computer-readable media of claim 17, further comprising a sensor driver to be operated by a processor to receive sensor signals representative of tendon or muscle positions of the wrist, and process the sensor signals to output the sensor data for the user authentication module.

22. The one or more non-transitory computer-readable media of claim 21, wherein the computer device further comprises a plurality of sensors coupled to the processor cores to sense and output the senor signals representative of the tendon or muscle positions of the wrist.

23. The one or more non-transitory computer-readable media of claim 22, wherein the computer device is a smart watch having a watch band, and the plurality of sensors are disposed on the watch band.

24. The one or more non-transitory computer-readable media of claim 21, wherein the computer device further comprises a communication interface to receive sensor signals from an external wrist band having a plurality of sensors to sense and output the senor signals representative of the tendon or muscle positions of the wrist, and process the sensor signals into the sensor data; wherein the external wrist band is not part of the apparatus.

25. The one or more non-transitory computer-readable media of claim 17, wherein the user authentication module is to further provide visual feedbacks to the user to assist the user in traversing the imaginary virtual grid; wherein to provide visual feedbacks comprises to display a graphical representation of the imaginary virtual grid, including indicators indicating portions of the imaginary virtual grid traversed.

* * * * *